(12) United States Patent
Longsworth

(10) Patent No.: US 7,997,088 B2
(45) Date of Patent: Aug. 16, 2011

(54) HYBRID SPOOL VALVE FOR MULTI-PORT PULSE TUBE

(75) Inventor: Ralph C. Longsworth, Allentown, PA (US)

(73) Assignees: Sumitomo Heavy Industries, Ltd., Tokyo (JP); SHI-APD Cryogenics, Inc., Allentown, PA (US)

(*) Notice: Subject to any disclaimer, the term of this patent is extended or adjusted under 35 U.S.C. 154(b) by 1124 days.

(21) Appl. No.: 11/719,697

(22) PCT Filed: Jan. 13, 2005

(86) PCT No.: PCT/US2005/001101
§ 371 (c)(1),
(2), (4) Date: May 18, 2007

(87) PCT Pub. No.: WO2006/075981
PCT Pub. Date: Jul. 20, 2006

(65) Prior Publication Data
US 2009/0151803 A1 Jun. 18, 2009

(51) Int. Cl.
*F25B 9/00* (2006.01)
(52) U.S. Cl. .................................. 62/6; 60/517
(58) Field of Classification Search .......... 62/6; 60/519, 60/522; 251/205–209; 137/625.24, 625.43, 137/625.46, 625.47, 624.22, 624.24, 625.23, 137/625.65; 417/505
See application file for complete search history.

(56) References Cited

U.S. PATENT DOCUMENTS

| | | | | |
|---|---|---|---|---|
| 3,119,237 A * | 1/1964 | Gifford | ............................. | 62/6 |
| 4,333,755 A | 6/1982 | Sarcia | | |
| 4,339,927 A | 7/1982 | Sarcia | | |
| 4,584,839 A * | 4/1986 | Jensen et al. | ........................ | 62/6 |
| 4,987,743 A | 1/1991 | Lobb | | |
| 5,129,236 A * | 7/1992 | Solomon | ...................... | 62/324.1 |
| 5,378,207 A * | 1/1995 | Stevenson | ..................... | 475/135 |
| 5,711,156 A * | 1/1998 | Matsui et al. | ....................... | 62/6 |
| 5,775,199 A * | 7/1998 | Sell | ................................. | 91/498 |
| 5,878,580 A * | 3/1999 | Schilling et al. | .................... | 62/6 |
| 5,901,737 A | 5/1999 | Yaron | | |
| 6,256,998 B1 | 7/2001 | Gao | | |
| 6,308,520 B1 * | 10/2001 | Inoue et al. | ......................... | 62/6 |
| 6,378,312 B1 * | 4/2002 | Wang | .................................. | 62/6 |
| 6,434,947 B2 * | 8/2002 | Zhu et al. | ............................ | 62/6 |
| 6,460,349 B1 * | 10/2002 | Kawano et al. | ..................... | 62/6 |
| 6,629,418 B1 * | 10/2003 | Gao et al. | ............................ | 62/6 |
| 6,694,749 B2 | 2/2004 | Heron | | |
| 7,549,295 B2 * | 6/2009 | Gao | ................................. | 62/6 |
| 2003/0089116 A1 * | 5/2003 | Heron | ................................. | 62/6 |
| 2003/0202896 A1 * | 10/2003 | Dong et al. | ................. | 418/61.3 |

FOREIGN PATENT DOCUMENTS

WO WO2005/088210 A1 9/2005

OTHER PUBLICATIONS

International Search Report and Written Opinion dated Apr. 29, 2005 from the corresponding PCT/US2005/001101 in English.
International Preliminary Report on Patentability dated Jul. 17, 2007 from the corresponding PCT/US2005/001101.

* cited by examiner

*Primary Examiner* — Frantz F Jules
*Assistant Examiner* — Lukas Baldridge
(74) *Attorney, Agent, or Firm* — Katten Muchin Rosenman LLP

(57) ABSTRACT

The problems of reducing the torque required to turn the valve, eliminating wear dust, and extending the life of the valves in Gifford McMahon (G-M) type multi-port pulse tube refrigerators are solved by using a rotary spool valve having radial clearance to control flow to and from the regenerator, and using face seal ports on the end of the spool to control flow to and from the pulse tubes.

8 Claims, 4 Drawing Sheets

FIG. 2 Valve timing chart for FIG. 1 pulse tube refrigerator

HYBRID SPOOL VALVE FOR MULTI-PORT PULSE TUBE

BACKGROUND OF THE INVENTION

The present invention relates to Gifford McMahon (G-M) type multi-port pulse tube refrigerators. G-M type pulse tubes consist of a compressor, a valve mechanism, and an expander. The present invention improves on a previous rotary valve disc and valve seat mechanisms. The improvement lies in replacing the face seal ports for flow to and from the regenerator with a rotary spool valve having radial clearance, while retaining the face seal ports for flow to and from the pulse tubes.

It has been found that best performance at 4 K has been obtained with a pulse tube as shown in FIG. 9 of Gao, U.S. Pat. No. 6,256,998. This design has two valves controlling flow to the regenerator, and four valves controlling flow to the warm ends of the pulse tubes, which open and close in the sequence shown in FIG. 11 of U.S. Pat. No. 6,256,998. The single stage version of this pulse tube has four valves, two to the regenerator and two to the pulse tube, thus this control is commonly referred to as four-valve control. The main problem of multi-ported rotary disc valves is that the diameter of the disc is significantly increased, relative to the two ported valves that are commonly used in standard G-M refrigerators to control flow to and from the regenerator, to accommodate the valve ports that control flow to and from one or two pulse tubes.

Various solutions have been proposed to minimize the diameter of a rotary disc valve but the high to low pressure difference increases the sealing force substantially and thus requires a motor with larger torque to turn it. The sealing force of a larger diameter valve can be reduced by transferring some of the force to an axial bearing as described in Lobb, U.S. Pat. No. 4,987,743, and Heron, U.S. Pat. No. 6,694,749.

While these methods to reduce the sealing force, and thus the torque required to turn the valve, are effective, the wear dust from the plastic type material that is typically used for the valve disc against a hard valve seat generally collects in the orifices that control flow to and from the pulse tubes and changes the cooling performance over time.

The problems of reducing the torque required to turn the valve, eliminating wear dust, and extending the life of the valve, have been addressed in pending patent application U.S. Ser. No. 60/551,154, entitled "Wearless Valve". This solution to these problems is based on supporting the rotating valve disc on a bearing and maintaining a small clearance between the valve disc and the valve face. This works well when the proper clearances are established. The small ports that control flow to and from the pulse tubes are very sensitive to leakage while the ports that control flow to and from the regenerator are less critical.

Yaron, U.S. Pat. No. 5,901,737 describes a rotating spool valve for a G-M type refrigerator that uses gas bearings to center the spool so that a small clearance can be maintained without contact. Sarcia, U.S. Pat. No. 4,333,755 describes a spool valve that shuttles back and forth to switch flow to the regenerator in a G-M type refrigerator It is an object of the present invention to provide an alternate solution to these problems in a simpler construction by using a rotary spool valve.

BRIEF SUMMARY OF THE INVENTION

The present invention provides a solution to these problems in a simple construction by using a rotary spool valve having radial clearance to control flow to and from the regenerator, and using face seal ports on the end of the spool to control flow to and from the pulse tubes. The diameter of the spool is much less than the diameter of a multi-ported disc valve so the torque required to turn it is reduced, even when ceramic materials with very low wear rate are used. In practice a ceramic material was used that was observed to show no signs of wear after about 15,000 hours of operation.

The present invention has been implemented with a ceramic material and a design that uses radial pressure balancing so that the friction forces between the spool and sleeve are minimized and a gas bearing is not needed.

The benefits of lowered sealing force, lowered torque required to turn the valve, and prevention of wear dust are obtained by using a rotary spool valve having radial clearance for the ports that control flow to and from the regenerator, while using axial face seal ports on the end of the spool for flow to and from the pulse tubes.

The spool, sleeve, and seat are all subject to wear. It is therefore important to use materials of construction that are highly resistant to wear. Ceramic materials are the preferred material of construction, with alumina ceramic being the most preferred material for the spool, sleeve, and seat.

DETAILED DESCRIPTION OF THE INVENTION

Figure 1:
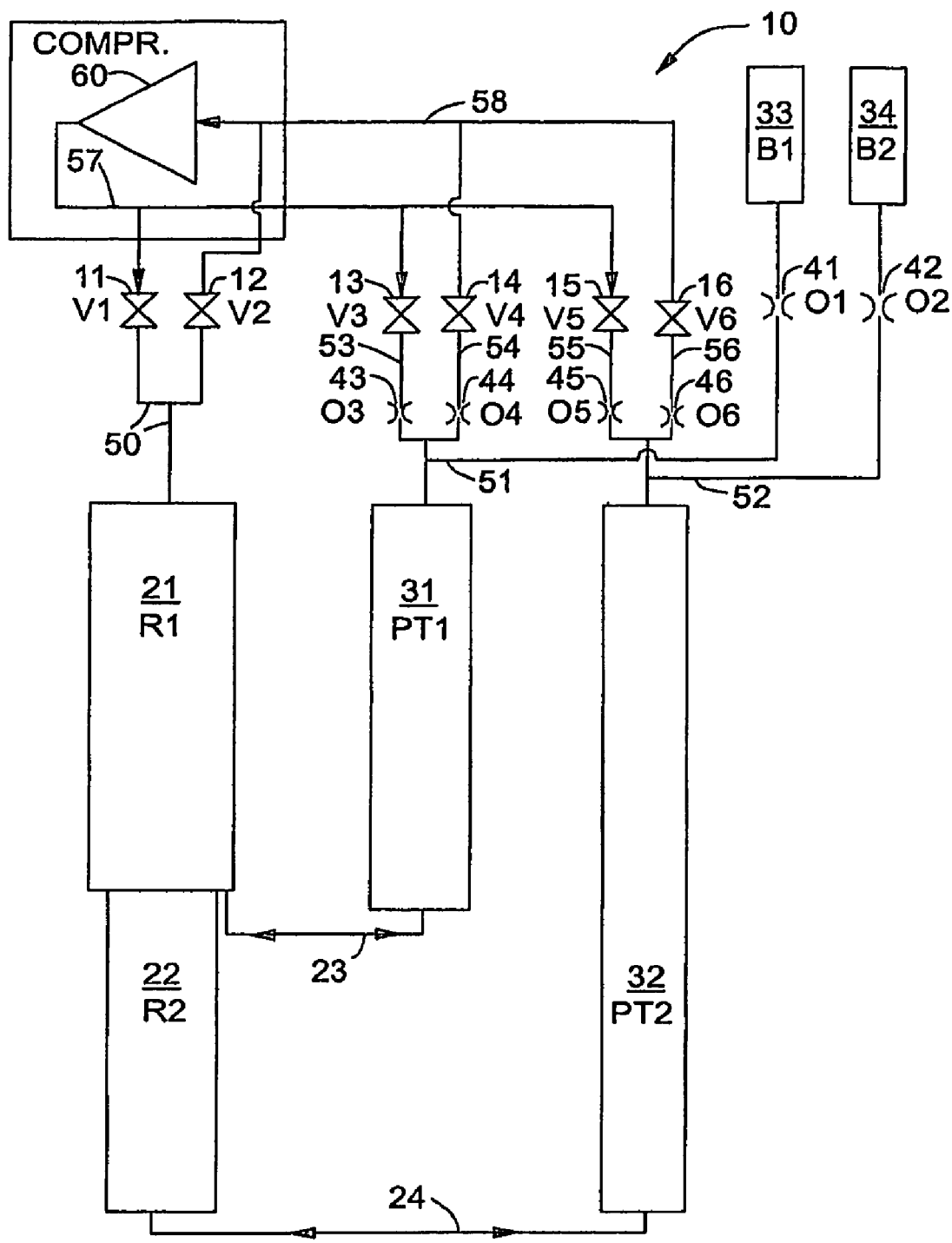
FIG. 1 is a schematic of a four-valve two-stage pulse tube.

FIG. 1 is a schematic of a two-stage four-valve pulse tube refrigerator 10 that shows the gas flow paths through the system. FIG. 1 illustrates refinements in a basic two-stage four-valve pulse tube refrigerator such as that illustrated in FIG. 9 of U.S. Pat. No. 6,256,998. High-pressure gas, Ph, flows from compressor 60 through gas line 57 to valves 11 (V1), 13 (V3), and 15 (V5). Low-pressure gas, Pl, returns to compressor 60 from valves 12 (V2), 14 (V4), and 16 (V6) through line 58. Valves V1 and V2 control the flow to and from regenerator 21 (R1) through line 50.

Valve V3 controls the flow to the first stage pulse tube 31 (PT1) through line 53, orifice 43 (O3) and line 51. Valve V5 controls the flow to the second stage pulse tube 32 (PT2) through line 55, orifice 45 (O5) and line 52. Valve V4 controls the flow from PT1 through line 51, orifice 44 (O4) and line 54. Valve V6 controls the flow from PT2 through line 52, orifice 46 (O6) and line 56.

Some of the gas that flows in and out of the warm end of PT1 flows through line 51, orifice 41 (O1), and buffer volume 33 (B1). Similarly, some of the gas that flows in and out of the warm end of PT2 flows through line 52, orifice 42 (O2), and buffer volume 34 (B2).

The inlet ends of R1, PT1, and PT2 are near ambient temperature while the other ends of PT1 and PT2 get cold as a result of the pulsing of gas into the cold ends after it flows through regenerator R1, regenerator 22 (R2), and connecting tubes 23 and 24. The gas that remains in the pulse tubes can be thought of as gas pistons. Gas flowing into the warm ends of PT1 and PT2 control the motion of the gas piston so that refrigeration is produced at the cold ends. A further description of the operation of a four-valve two-stage pulse tube is contained in U.S. Pat. No. 6,256,998.

The refinements shown in FIG. 1 relative to FIG. 9 of U.S. Pat. No. 6,256,998 are orifices O3, O4, O5, O6, and the division of the buffer volume into two separate volumes, B1 and B2. The orifices preferably are variable and can be adjusted to optimize the cooling during the manufacturing process.

Once the optimum size of the flow passages is determined, they can be incorporated into the ports in valves V3, V4, V5, and V6. Splitting the buffer volume into separate volumes for each pulse tube eliminates the possible circulation of gas from one pulse tube to the other through the buffer volume.

Figure 2:
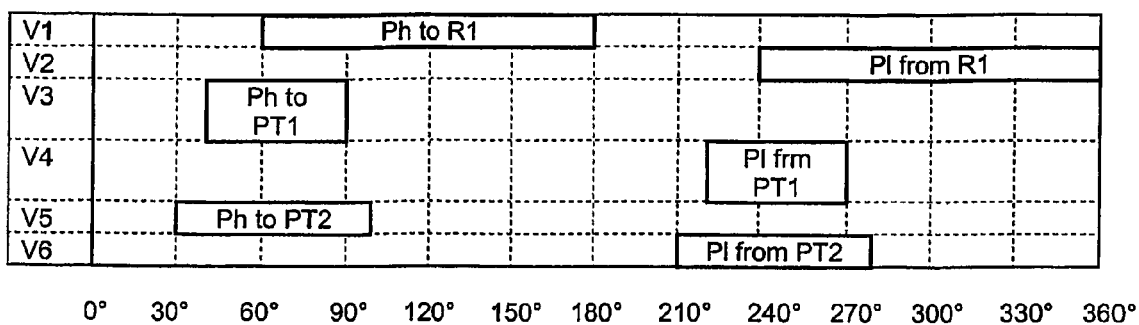
FIG. 2 is a timing chart for the valves shown in FIG. 1.

FIG. 2 is a timing chart for valves V1 to V6 showing the open periods that have been found to optimize the cooling. It is important to recognize the differences in timing for each of the valves and to emphasize the importance of having a fixed relationship of the opening and closing of each port.

Figure 3:
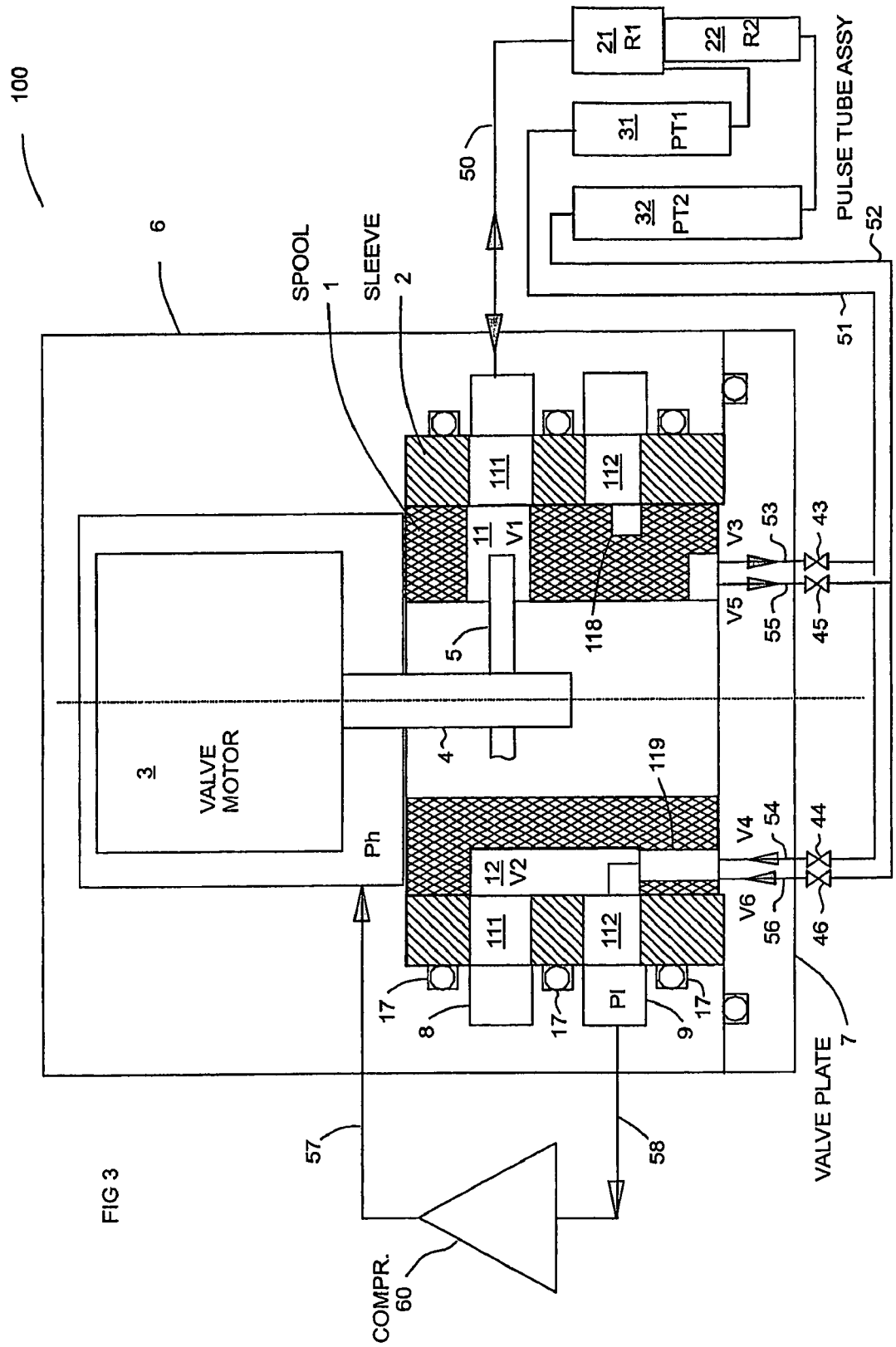
FIG. 3 is a cross section view of the present invention showing the porting of the valve, the relation to other components of the valve assembly, and the flow relation to the compressor and pulse tube.

FIG. 3 is a cross section view of valve assembly 100, which also shows the flow relation to the compressor and pulse tube. Designations are the same as FIG. 1. Valve assembly 100 consists of spool 1, sleeve 2, valve motor 3 that turns shaft 4 which in turn holds drive pin 5 that engages and turns spool 1. These components are contained in housing 6 which is sealed by valve plate 7. Manifold 8, which is machined into housing 6, contains gas that cycles to and from regenerator 21 through line 50. Manifold 9, which is also machined into housing 6, connects to the return side of compressor 60 through line 58 and contains gas at low pressure, Pl.

Manifolds 8 and 9 are sealed by "O" rings 17 on the outside of sleeve 2. Gas at high pressure, Ph, flows from compressor 60 through line 57 into housing 1 where it fills the space around motor 3 and inside spool 1. The difference between Ph acting on the top surface of spool 1, and part of the bottom surface of spool being at Pl, provides the force needed to seal the ports in the bottom of spool 1 in sliding contact with the ports in valve plate 7.

The cross section view of sleeve 2 shows circular ports 111 and 112 at a position 180° apart. This is the case for two cooling cycles per revolution of spool 1. The right cross section view of spool 1 and sleeve 2 shows the porting for gas at Ph to flow to regenerator 21 through ports 11 (V1) and 111, and to pulse tubes 31 and 32 through V3 and V5.

Valve V1 is open when port 11 in spool 1 is aligned with port 111 in sleeve 2. Valve V3 supplies gas at Ph to the warm end of PT1, 31, through line 53 orifice 43 and line 51. Valve V5 supplies gas at Ph to the warm end of PT2, 32, through line 55 orifice 45 and line 52.

The left cross section view of spool 1 shows the porting when spool 1 is rotated 90° with respect to the right hand view. This view shows the porting for gas at Pl to flow from regenerator 21 through port 111, 12 (V2) and 112, and from pulse tubes 31 and 32 through V4 and V6.

Valve V2 is open when port 12 in spool 1 is aligned with ports 111 and 112 in sleeve 2. Valve V4 returns gas at Pl to compressor 60 from the warm end of PT1, 31, through line 51 orifice 44 line 54 and line 58. Valve V6 returns gas at Pl to compressor 60 from the warn end of PT2, 32, through line 52 orifice 46 line 56 and line 58. The design of the ports for V3, V4, V5, and V6 are described in connection with FIG. 4.

The phase chart in FIG. 2 represents one cycle as 360°; however, a spool valve that only had one cycle per revolution would have very unbalanced lateral pressure forces that would result in high friction forces. A spool valve with radial ports should have at least two cooling cycles per revolution of the valve to balance the lateral pressure forces.

A two-cycle valve would have two ports 111, and ports 112, in sleeve 2, 180° apart, as shown in FIG. 3. These are typically round holes. There would also be two ports 11, and ports 12, in spool 1, 180° apart. These are typically slotted to provide the duration of time that is desired for the port to be open.

Figure 4:
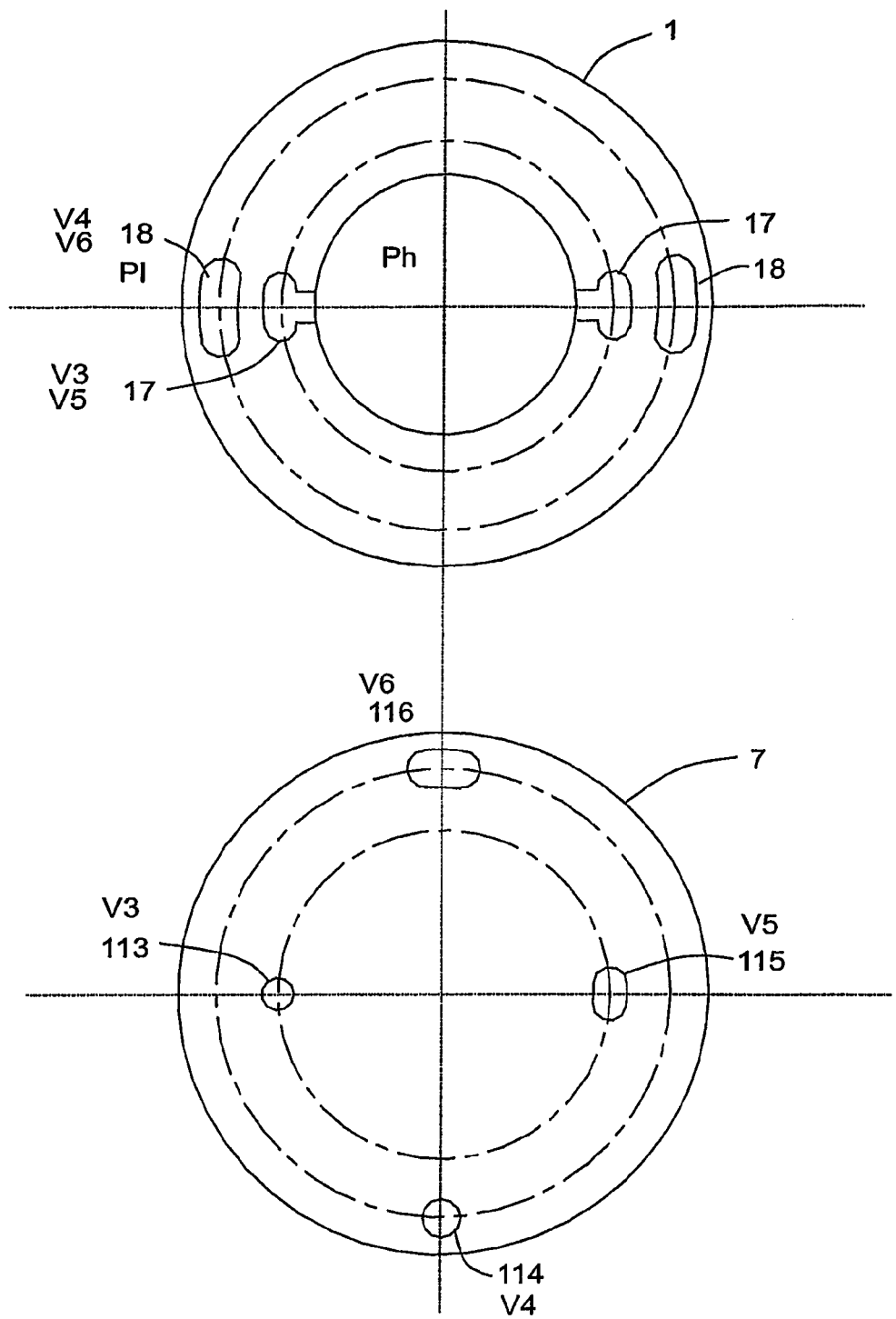
FIG. 4 is a view of the faces of a valve seat and the end of the spool, showing the ports for flow to and from two four valve type pulse tubes, and having two cooling cycles per revolution of the spool.

FIG. 4 is a view of the face of a valve seat 7 and the end of spool 1, showing the ports for flow to and from two four valve type pulse tubes, and having two cooling cycles per revolution of the spool. Ports 17 are symmetrical, as are ports 18, in spool 1. Ports 17 are in communication with gas at Ph in the center of spool 1. Ports 18 are in communication with gas at Pl, through hole 119 and circumferential groove 118 on the outside of spool 1, as seen in FIG. 3. Port 113 in valve seat 7 is the inlet to line 53 as seen in FIG. 3. Valve 3 is open when port 17 slides over port 113. Port 115 in valve seat 7 is the inlet to line 55 as seen in FIG. 3.

Valve 5 is open when port 17 slides over port 115. Valve 5 is open longer than valve 3 by virtue of port 115 being slotted relative to port 113. Valve 4 is open when port 18 slides over port 114. Port 114 in valve seat 7 is the inlet to line 54 as seen in FIG. 3. Valve 6 is open when port 18 slides over port 116. Valve 6 is open longer than valve 4 by virtue of port 116 being slotted relative to port 114.

Having valves V3 and V5, which both control flow at Ph, at the same radius, and V4 and V6, which both control flow at Pl, at a second radius, minimizes the difference between the inside and outside diameters of the spool.

If three cooling cycles per revolution of spool 1 are desired then the angle between the right and left cross sections in FIG. 3 is 60° instead of 90° and there would be three pairs of radial ports at 120° that connect to regenerator 21. The end view of spool 1 shown in FIG. 4 would have three pairs of ports 17 and 18 at 120°. Valve seat 7 in FIG. 4 would have the same ports as shown, but ports 116 and 114 in the outer track would be 120° rather than 180° apart, and ports 113 and 115 in the inner track would be spaced 60° from them.

It is recognized that variations of the preferred design that has been described can be used, such as wear resistant materials other than ceramics, axial loading by mechanical rather than pneumatic means, flow in the reverse direction, or ports on more tracks.

The foregoing describes the invention in terms of embodiments foreseen by the inventors for which an enabling description was available, notwithstanding that insubstantial modifications of the invention, not presently foreseen, may nonetheless represent equivalents thereto.

The invention claimed is:

1. A multi-ported rotary spool valve for a G-M pulse tube refrigerator, comprising:
   a close fitting rotating spool mounted inside a fixed sleeve having multiple radial ports; and
   an end face on said rotating spool including a flat face in sliding contact with the flat face of a valve plate having multiple axial ports, wherein
   said sliding contact being maintained by virtue of a gas pressure being higher on an end of the spool opposite the ports than an average pressure on an end of the spool with the ports, and
   gas flows to a regenerator of said pulse tube through said radial ports and gas flows to a warm end of one or more pulse tubes through said axial ports.

2. The rotary spool valve of claim 1 where two or more cooling cycles are executed during each revolution of the spool.

3. The rotary spool valve of claim 1 where the G-M type pulse tube refrigerator is a two stage, four valve type pulse tube.

4. The rotary spool valve of claim 1 where high pressure ports for flow to pulse tubes are located on one track and low pressure ports for flow from the pulse tubes are located on a second track.

5. The rotary spool valve of claim 3 where timing for flow to a second stage of the two stage is different than timing for flow to a first stage of the two stage.

6. The rotary spool valve of claim 1 where the spool, sleeve, and valve plate are ceramic.

7. The rotary spool valve of claim 6 where the ceramic is alumina.

8. The rotary spool valve of claim 1 where the average radial clearance between the rotating spool and stationary sleeve is greater than 0 and less than 5 microns.

* * * * *